United States Patent Office 2,737,512
Patented Mar. 6, 1956

2,737,512

PREPARATION OF 11β-HYDROXY-3,20-DI-KETAL PREGNENES

Seymour Bernstein, Pearl River, N. Y., and Ruddy Littell, Ridgefield Park, N. J., assignors to American Cyanamid Company, New York, N. Y., a corporation of Maine No Drawing. Application October 12, 1953,
Serial No. 385,677

4 Claims. (Cl. 260—239.55)

This invention relates to a method of preparing 11β-hydroxy pregnenes. More particularly, it relates to an improved method of preparing hydrocortisone di-ketals and esters thereof.

In United States Patent 2,622,081 a method of preparing $\Delta^5$pregnene-11β,17α,21-triol-3,20-dione-3,20-di-ethylene ketal is described and claimed. This compound has been found to be an important intermediate in the conversion of cortisone to hydrocortisone. The process described in the above patent will produce 11β-hydroxy-pregnene from the corresponding 11-ketopregnene in yields of approximately 58% (Journal of Organic Chemistry 18, page 80, January 1953). A process capable of producing these intermediates in better yields is highly desirable.

We have now found that a di-ketal of an 11β-hydroxy-pregnene can be prepared from the corresponding 11-ketopregnene in yields of over 90% by the use of a new reduction procedure. In carrying out the new process a di-ketal of 11-ketopregnene is reacted with a metal borohydride in the presence of a solvent for a sufficient time to complete the reduction.

The reduction process of the present invention permits considerable latitude in the selection and range of operating conditions. The concentration of the di-ketal of 11-ketopregnene and the borohydride can vary from 5 to 20 times the stoichiometric amount of borohydride to the pregnene derivative. When a large excess of borohydride is used the duration of the reaction and/or the temperature can be decreased and still produce the same results.

The preferred intermediate is $\Delta^5$-pregnene-17α,21-diol-3,11,20-trione-3,20-di-ethylene ketal (di-ethylene ketal of cortisone). Other compounds can be used such as di-propylene ketal of cortisone, di-butylene ketal of cortisone, etc. Since these compounds contain a hydroxyl group in the 21-position, they can be used in the form of their acetate, propionate, butyrate, benzoate, etc.

The reaction can be carried out at temperatures which may vary from 20° to 100° C. At this temperature range the reaction will be complete in a period of from 5 to about 60 hours, depending also upon the amount of borohydride present.

Among the solvents which can be used are tetrahydrofuran, ethanol, isopropanol, dioxane, and the like. A preferred solvent is a mixture of tetrahydrofuran and water. In carrying out the reaction it is also desirable that the reaction medium be alkaline in order to increase the stability of the borohydride reducing agent. The alkaline conditions can be assured by the presence of a small amount of alkaline substance in the reaction mixture such as an alkali metal hydroxide, alkaline earth metal hydroxide, and the like.

In carrying out the process the usual available grades of sodium borohydride or lithium borohydride can be used, taking into account the purity of the material used. It is desirable that at least five times the equivalent amount of borohydride to pregnene be maintained since amounts considerably below this produce results varying from poor to no result.

In addition to the much higher yields produced by the process of the present invention it has a further advantage in that the 11 alpha-epimer, the di-ketal of epi-hydrocortisone, is produced in small amounts, usually less than 1%. The new process, therefore, represents a highly desirable advantage in producing very high yields with small amounts of by-products, thus permitting a simpler purification than prior art methods.

The following examples describe in greater particularity the process of the present invention.

Example 1

A mixture of 1.0 gram of the di-ketal of cortisone, 40 ml. of tetrahydrofuran, 1.20 grams of sodium borohydride (20:1 molar ratio of hydride to di-ketal), 3.3 ml of 5% aqueous sodium hydroxide and 4 ml. of water was refluxed for 18 hours. About 40 ml. of water was added and the mixture was concentrated under reduced pressure to remove the tetrahydrofuran. The aqueous residue was extracted with 200 ml. of ethyl acetate and the extract was washed three times with about 20 ml. each time of saturated sodium chloride and once with a small amount of water. The washed extract was treated with anhydrous magnesium sulfate and activated charcoal and then filtered. The filtrate was concentrated under reduced pressure to a glass, which was dissolved in about 25 ml. of acetone. About 15 ml. of petroleum ether was added and the solution was cooled, causing the product to crystallize. The crystals were filtered off and dried and a second crop of crystals was recovered from the filtrate. The first crop of crystals weighed 517 mgm. and melted at 180°–192° C. The second crop of crystals weighed 190 mgm. and melted at 189°–193° C. The combined total of 707 mgm. of the di-ketal of hydrocortisone was obtained.

Example 2

A mixture of 3 grams of the di-ketal of cortisone, 120 ml. of tetrahydrofuran, 3.6 grams of sodium borohydride (20:1 ratio of hydride to di-ketal), 10.5 ml. of 5% aqueous sodium hydroxide and 10.5 ml. of water was refluxed for 19 hours. Approximately 120 ml. of water was added and the tetrahydrofuran was co-distilled off under reduced pressure. The crude product was filtered off as a solid from the aqueous residue. This material was dissolved in acetone and filtered through diatomaceous earth. The filtrate was concentrated under reduced pressure to yield 2.8 grams of crude product. The entire 2.8 grams was dissolved in about 100 ml. of acetone and petroleum ether was added with chilling. The crystals which precipitated were filtered off and dried, giving 2.15 grams of purified product, melting at 194°–199° C. It was possible to recover another 0.42 gram, melting at 183°–191° C., from the filtrate. This latter crop ultimately yielded 0.41 gram of product, melting at 183°–191° C. and 9 mgm. of the di-ketal of 11-epi-hydrocortisone, melting at 266°–270° C. The total of 2.56 grams of the di-ketal of hydrocortisone represents a yield of 85%.

Example 3

A mixture of 23.6 grams of the di-ketal of cortisone, 800 ml. of tetrahydrofuran, 24 grams of sodium borohydride (20:1 ratio of hydride to di-ketal), 75 ml. of 5% aqueous sodium hydroxide and 75 ml. of water was refluxed for 16 hours. Approximately 800 ml. of water was added and the tetrahydrofuran was co-distilled off under reduced pressure. The residual aqueous mixture was extracted with one liter of chloroform and the extract was washer with 100 ml. each time of saturated sodium chloride. The washed extract was treated with anhydrous magnesium sulfate and activated charcoal and then filtered through diatomaceous earth. The filtrate was concentrated under reduced pressure to a white solid, di-ketal of hydrocortisone, which after being dried in the vacuum oven for 15 minutes at 60° C. weighed 24 grams. The product was dissolved in 85 ml. of pyridine by warming the mixture on the steam cone. Insoluble particles were removed by filtering the mixture through diatomaceous earth and the filtrate was cooled to 0° C. While cooling the mixture in an ice bath, 25 ml. of cold acetic anhydride was added and the resulting mixture was left at room temperature overnight (18 hours). About 350 ml. of water was added, causing an oil to precipitate from solution. Cooling and scratching caused the oil to crystallize and the crystals were filtered off, washed with a small amount of cold water and dried under vacuum at 75° C. for four hours. The di-ketal of hydrocortisone acetate weighed 23.9 grams and melted at 195°–198° C., an overall yield of 92.2% from the di-ketal of cortisone.

We claim:

1. An improved method for the conversion of the di-ethylene ketal of cortisone to the di-ethylene ketal of hydrocortisone comprising contacting in solution the di-ethylene ketal of cortisone with about 5 to 20 equivalents of sodium borohydride under alkaline conditions and isolating the di-ethylene ketal of hydrocortisone therefrom.

2. An improved method for the conversion of the di-ethylene ketal of cortisone to the di-ethylene ketal of hydrocortisone comprising contacting in solution the di-ethylene ketal of cortisone with about 10 to 20 equivalents of sodium borohydride under alkaline conditions whereby the 11-keto group is reduced to a β-hydroxyl group and isolating the di-ethylene ketal of hydrocortisone from the reaction mixture.

3. An improved method for the conversion of the di-ethylene ketal of cortisone to the di-ethylene ketal of hydrocortisone comprising contacting in solution the di-ethylene ketal of cortisone with about 20 equivalents of sodium borohydride under alkaline conditions and recovering the di-ethylene ketal of hydrocortisone from the reaction mixture.

4. An improved method for the conversion of the di-ethylene ketal of cortisone to the di-ethylene ketal of hydrocortisone the step which comprises contacting in tetrahydrofuran the di-ethylene ketal of cortisone with 5 to 20 equivalents of sodium borohydride.

References Cited in the file of this patent

UNITED STATES PATENTS

| | | |
|---|---|---|
| 2,622,081 | Bernstein | Dec. 16, 1952 |
| 2,671,095 | Levin | Mar. 2, 1954 |
| 2,674,606 | Levin | Apr. 6, 1954 |